Patented June 29, 1937

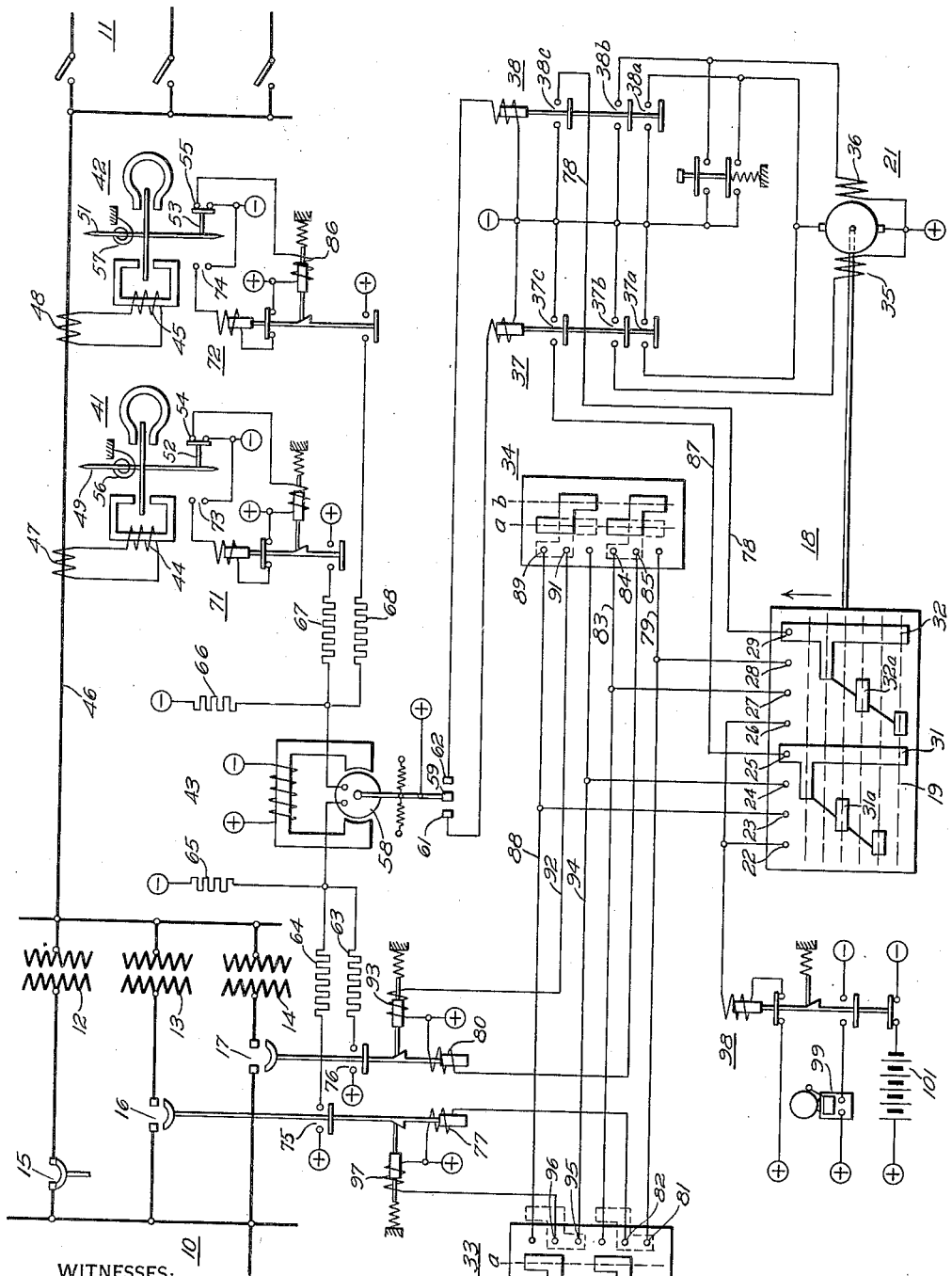

2,085,122

UNITED STATES PATENT OFFICE 2,085,122

AUTOMATIC SUBSTATION

Maurice E. Reagan, Pittsburgh, Pa., assignor to Westinghouse Electric & Manufacturing Company, East Pittsburgh, Pa., a corporation of Pennsylvania Application June 5, 1935, Serial No. 25,171

11 Claims. (Cl. 171—118)

My invention relates, generally, to automatic substations and, more particularly, to control systems for automatically controlling the connection and disconnection of electrical translating devices such, for example, as transformers, converters, etc., in accordance with load demand and the connected capacity.

Heretofore, various kinds of arrangements have been used for switching translating units in and out of service in accordance with load demand and connected capacity involving generally the use of mechanical relays of the balancing type having a pair of oppositely disposed solenoids one of which was energized in accordance with the total capacity of the connected translating devices and the other in accordance with the load demand by means of suitable load relays. In order to greatly improve the operation and functioning of these systems I propose to provide a system of the same general character but which operates upon a different principle in that it utilizes only one single element relay connected to effect an electrical balance instead of a mechanical balance.

It is, therefore, the object of my invention generally stated to provide for automatically connecting and disconnecting translating units from a system in accordance with load demand and amount of connected capacity.

A more specific object of my invention is to provide for utilizing a single element relay for controlling the connecting and disconnecting operations of a plurality of translating devices or units in accordance with load demand.

Another object of my invention is to provide for automatically connecting and disconnecting power translating units in accordance with load demand by means of an electrical balancing or bridge system and a relay having a single moving element.

A still further object of the invention is to provide for utilizing a Wheatstone bridge circuit and relay controlled thereby for effecting the automatic connection and disconnection of translating units between a power circuit and a load distribution circuit.

A further object of my invention is to provide for operating a plurality of circuit breakers to connect and disconnect translating units in predetermined sequence by means of a relay controlled by a Wheatstone bridge circuit which is unbalanced in one direction or the other in accordance with load demand and restored to balance by the operations of the breakers.

These and other objects of my invention will become more apparent from a study of the following general and detailed descriptions when considered with the drawing in which the single figure is a diagrammatic illustration of an automatic translating station embodying the principal features of the invention.

In carrying out my invention in its most elementary form, the circuit breakers which connect the translating units between the power source and the load distribution circuit are controlled by a motor-operated drum switch operable in one direction to close the breakers in a predetermined sequence and in the opposite direction to open the breakers. The drum switch is preferably controlled by a relay of the galvanometer type having a single movable coil element for actuating its contact member from a normal non-operating or neutral position to either one of two operating positions dependent upon the direction of flow of current through the coil. The galvanometer relay is controlled by means of a Wheatstone bridge crcuit which has a normal balanced condition and which is unbalanced by the operation of load relays in response to predetermined increases and decreases in the load current and is rebalanced by the closing or opening operation of a circuit breaker as the case may be. The bridge is unbalanced in one direction when the load increases a predetermined amount and in the opposite direction when it decreases a predetermined amount. The unbalancing of the bridge in opposite directions causes the galvanometer relay to selectively control the drum switch to automatically connect and disconnect translating units in accordance with the relation between the load demand and the connected capacity or number of connected units.

Referring now to the drawing, there is shown by means of a single line diagram, a high voltage source of power 10 for supplying power to a low voltage distribution system 11 through a plurality of translating units 12, 13 and 14, which are illustrated in this instance as transformers although it is to be understood that any other type of translating unit such, for example, as rotary converters and motor generator sets may be used.

In this instance, the translating unit 12 may be referred to as the main unit and is connected to the source by means of a circuit breaker 15 which may be controlled in any well known manner. This unit is usually connected in order to supply the load requirements to a certain predetermined amount. The translating units 13 and 14 are disposed to be automatically connected and disconnected from the supply circuit in accordance with load demand by means of circuit breakers 16 and 17. In this instance only the high-tension circuit breakers have been illustrated, however, it is the usual practice to use both high and low-tension circuit breakers which are jointly or separately controlled.

The energization of the closing and tripping coils of the circuit breakers 16 and 17 may be controlled in any suitable manner such, for example, as by means of the motor-operated sequence switch 18 comprising a drum element 19 and a motor 21. The drum element 19 is provided with a plurality of fixed contact fingers 22 through 29 and a plurality of drum segments 31 and 32, which function as will be described in detail hereinafter to effect closing and tripping operations of the circuit breakers 16 and 17 in a predetermined sequence.

The sequence in which the circuit breakers 16 and 17 are operated is determined by means of preference switches 33 and 34 which may be set to control the order in which the circuit breakers 16 and 17 are closed and opened by the operation of the sequence switch 18.

The actuating motor 21 for the sequence switch is provided with field windings 35 and 36 which when separately energized cause the motor to run in opposite directions. The energization of the motor is directly controlled by means of direction switches 37 and 38, which also cooperate with the sequence switch 18 and the preference switches 33 and 34 in controlling the operation of the circuit breakers as will be described hereinafter.

In order to provide for automatically controlling the circuit breakers 16 and 17 and thereby the connection and disconnection of the units 13 and 14 in accordance with the load demand, there is provided a plurality of load relays 41 and 42 and a balancing relay 43. The load relays are illustrated as induction type relays having their operating coils 44 and 45 connected to a connecting bus 46 by means of suitable current transformers 47 and 48. The moving elements 49 and 51 of the relays are provided with movable contact elements 52 and 53 which are normally retained in engagement with back contact members 54 and 55 by means of the spring elements 56 and 57.

In this embodiment of the invention, the balancing relay 43 is illustrated as a galvanometer type relay having a single moving element or coil 58 adapted to actuate a movable contact element 59 in opposite directions to engage stationary contact elements 61 and 62 dependent upon the direction of flow of current through the coil 58. As shown, the balancing relay functions to control the operation of the direction switches 37 and 38 which, in turn, control the direction of operation of the sequence switch 18.

The operation of the balancing relay 43 is controlled by means of a Wheatstone bridge system comprising a plurality of resistors 63 through 68, which are connected together and to the source of direct current supply in such manner that the moving coil 58 of the relay may be connected across the bridge circuit and thereby become responsive to the currents which flow when the bridge becomes unbalanced.

In this instance, the unbalanced condition of the bridge circuit is utilized to effect the operation of the balancing relay 43 in one direction or the other depending upon the relation of the load demand to the capacity or number of translating units which are connected. The unbalancing of the bridge is effected as a result of the operation of the load relays 41 and 42 by means of auxiliary relays 71 and 72 which are controlled by the front contact members 73 and 74 of the load relays 41 and 42, respectfully, and which function to unbalance the bridge by the connection of the resistors 67 and 68 to the positive battery terminal. Another leg of the bridge constituted by the resistors 63 and 64 is controlled in accordance with the position of the circuit breakers 16 and 17 through their auxiliary contact members 75 and 76.

It is apparent that when the load is sufficiently low that it may be carried by the main translating unit 12, the bridge circuit is deenergized since the circuit breakers 16 and 17 are both open and the load relays 41 and 42 are both in their nonoperated position. The balancing relay 43 is, therefore, deenergized and remains in its normal or neutral position as shown. Upon a predetermined increase in the station load for which the load relay 41 is set to operate, it closes its front contacts 73 to energize the auxiliary relay 71, which, when operated is latched in its closed position, and connects the resistor 67 to the positive terminal. Since the resistors 63 and 64 of the bridge are disconnected, the bridge will become unbalanced causing a current to flow through the coil of the balancing relay in such direction as to actuate the contact 59 into engagement with the fixed contact 62. This establishes an obvious energizing circuit for the direction switch 38 which closes its contact members 38a and 38b to energize the motor 21 and closes its contact members 38c to establish an energizing circuit for the drum element 19.

The translating unit which is to be first connected may be determined by the setting of the preference switches 33 and 34 and in this instance these switches are shown in such position by dotted outlines of their contact segments that the circuit breaker 16 will be closed first. It is to be understood, however, that a reversal of the positions of the preference switches will effect the reverse operation of the circuit breakers 16 and 17.

The motor 21 being energized drives the drum element 19 in the direction, as indicated by the arrow, until the contact fingers 28 and 29 are bridged by the segment 32 which establishes an energizing circuit for the closing coil 77 of the circuit breaker 16. This circuit extends from negative battery through contact members 38c, conductor 78, contact fingers 28 and 29 of the sequence switch bridged by segment 32, cut-in bus 79, contact fingers 81 and 82 of the preference switch 33 and closing coil 77 of the breaker to positive battery.

Upon the closure of the breaker 16, its auxiliary contact members 75 are closed to connect the bridge resistor 64 to positive battery, thereby re-establishing the balance of the bridge to effect the deenergization of the balancing relay 43. When the balancing relay 43 returns to its neutral position, the direction switch 38 is deenergized and the sequence switch 18 stopped.

In the event of a further predetermined increase in load, the load relay 42 functions to effect the operation of its associated auxiliary relay 72, thereby connecting the bridge resistor 68 in parallel with resistor 67 which again unbalances the bridge to such an extent as to operate the balancing relay 43 in the same direction. As will be readily understood, the second operation of the direction switch 38 causes the sequence switch 18 to advance until contact fingers 27 and 29 are bridged by the segments 32 and 32a. This establishes an energizing circuit which extends from the finger 27 through the cut-in bus 83 and contact fingers 84 and 85 of the preference switch 34 to the closing coil 80 of the breaker 17. Upon the closure of this breaker, its auxiliary contacts 76 are closed to connect the bridge resistor 63 which again reestablishes the balance of the bridge and deenergizes the coil of relay 43.

It is apparent that both the contact fingers 23 and 24 of the sequence switch have been bridged by the segment 31. However, they were ineffective because of the position of the direction switch 37 which has not as yet been energized. In the event, however, that the load decreases a predetermined amount, the load relay 42 is caused to open thereby engaging its back contacts 55 to release the latch 86. In response to the opening of the auxiliary relay 72 the bridge resistor 68 is disconnected, thereby unbalancing the bridge in the opposite direction to effect the operation of relay 43 and the energization of the direction switch 37.

The operation of switch 37 now energizes the motor 21 in the opposite direction through contact members 37a and 37b which causes the drum to move in the reverse direction. The movement of the drum causes contact fingers 23 and 25 to become bridged by the segments 31 and 31a to establish a tripping circuit for the circuit breaker 17 which was last closed. This circuit extends from negative battery through contact members 37c, conductor 87, contact fingers 23 and 25, shut-down bus 88, contact fingers 89 and 91 of the preference switch 34, conductor 92 and tripping coil 93 of the breaker 17 to positive battery. Upon the opening of the breaker 17, its auxiliary contact members 76 are opened to disconnect the bridge resistor 63 which again establishes the balance of the bridge.

In the event of a further predetermined decrease in the load, the load relay 41 functions to likewise release its auxiliary relay 71 to disconnect the bridge resistor 67 and again operate the direction switch 37. In this instance, the sequence switch 18 continues to move toward its original position until contact fingers 24 and 25 are bridged, which establishes an obvious energizing circuit from contact finger 24 through the shut-down bus 94 and contact fingers 95 and 96 of the preference switch 33 to the tripping coil 97 of the breaker 16. The opening of this breaker disconnects the bridge resistor 64 to again reestablish the balance of the bridge.

In order to protect the system against damage in the event that the sequence switch 18 is actuated beyond predetermined limits in either direction, provision is made for utilizing its movement to effect the energization of a lock-out relay 98 which functions both to operate an alarm device 99 and to disconnect the battery or source of direct current power 101. The lock-out relay 98 is of the latching type and remains in its operated position until reset by the operator. Its energizing circuit is established by the engagement of contact fingers 22 or 26 of the sequence drum.

In view of the foregoing description, it is apparent that the invention provides a system of control which is simple and positive in operation and which functions only in response to definite predetermined increases and decreases in the station load. The balancing relay is normally in a deenergized or neutral condition and is operated only when a switching operation is to be performed. Its operation is positive and it operates immediately in response to the operation of the load relays without any bouncing of its contact elements.

It may be stated in conclusion that while the illustrated example constitutes a practical embodiment of my invention, I do not wish to limit myself strictly to the exact details herein illustrated, since modifications of the same may be made without departing from the spirit of the invention as defined in the appended claims.

I claim as my invention:

1. In an automatic station having a plurality of translating units to be connected between a supply source and a load circuit, control means operable to effect the connection and disconnection of said units in predetermined sequence, means including a relay operable to a plurality of different control positions dependent upon the direction of current flow therethrough for controlling the operation of the control means, and means responsive to a predetermined unbalance between the load demand and the number of the connected units for effecting the operation of the relay to one or another of its control positions by controlling the direction of current flow therethrough.

2. In an automatic station having a plurality of translating units to be connected between a supply source and a load circuit, electrically-operated switching means operable to effect the connection and disconnection of said units in predetermined sequence, means including a normally deenergized relay responsive to direction of current flow for selectively controlling the operation of the switching means, and means including a Wheatstone bridge circuit for energizing said relay in one direction or the other dependent upon the relative values of load demand and number of the connected units.

3. In an automatic station, a source of supply, a load circuit, a plurality of translating units disposed to be connected between the source and load, electrically-operated means for connecting and disconnecting said units in predetermined sequence, a relay having a normal non-operating position and a plurality of operated positions for controlling the operation of the electrically-operated means, and means including a bridge circuit for controlling the energization of the relay in accordance with the amount of load and the number of the connected units.

4. In an automatic station, a source of supply, a load circuit, a plurality of translating units disposed to be connected between the source and load, electrically-operated means for connecting and disconnecting said units in predetermined sequence, a relay having a normal non-operating position and a plurality of operated positions for controlling the operation of the electrically-operated means, a bridge circuit for controlling the energization of the relay, means responsive to load demand for unbalancing the bridge circuit to initiate the operation of the relay, and means actuated in accordance with number of units connected for rebalancing the bridge circuit to restore said relay to its non-operating position.

5. In an automatic station, a source of power, a load circuit, a plurality of translating units disposed to be connected between the power source and the load circuit, switching means operable to connect and disconnect said units in predetermined sequence, a Wheatstone bridge circuit controlled in accordance with the number of units connected and the load demanded, a relay having an operating coil connected across the bridge circuit and operable in accordance with the direction of unbalance thereof to selectively control the operation of the switching means to effect the automatic connection and disconnection of units in accordance with the load.

6. In an automatic station, a source of power, a load circuit, a plurality of translating units disposed to be connected between the power source and the load circuit, switching means operable to connect and disconnect said units in predetermined sequence, a Wheatstone bridge circuit, a relay disposed to be energized in accordance with the direction of unbalance of the bridge circuit to control the operation of the switching means, means responsive to the load current for controlling one portion of the bridge circuit to initiate the operation of the relay, and means responsive to the number of units connected for controlling another portion of the bridge circuit to render the relay non-operative, thereby to provide for automatically connecting and disconnecting the translating units in accordance with load demand.

7. In an automatic station, a source of power, a load circuit, a plurality of translating units disposed to be connected between the power source and the load circuit, switching means operable to connect and disconnect said units in predetermined sequence, a Wheatstone bridge circuit, a control relay having its operating coil connected across the bridge circuit for controlling the operation of the switching means in accordance with the direction of unbalance of the bridge circuit, a plurality of load-responsive relays operable to unbalance the bridge circuit in opposite directions dependent upon the relative values of total load and number of the connected units, and means responsive to the connection and disconnection of units for restoring the balance of the bridge circuit.

8. The combination with a plurality of translating devices, circuit breakers for connecting said devices to load and supply circuits, of a motor-operated controller for controlling the operation of the breakers to effect the connection and disconnection of the units in a predetermined sequence, a relay for controlling the direction of operation of the controller, said relay having an operating coil responsive to the direction of flow of its energizing current, and means including a resistor bridge circuit for selectively controlling the energization of the relay coil in accordance with the number of units connected and the total load whereby the units are connected and disconnected in response to predetermined increases and decreases, respectively, in the total load.

9. The combination with a plurality of translating devices, circuit breakers for connecting said devices to load and supply circuits, of a motor-operated controller for controlling the operation of the breakers to effect the connection and disconnection of the units in a predetermined sequence, a relay for controlling the direction of operation of the controller, said relay having an operating coil responsive to the direction of flow of its energizing current, a Wheatstone bridge circuit for energizing the relay coil, a plurality of load relays successively operable in response to predetermined increases and decreases in the load for controlling one portion of the bridge circuit, and means actuated in accordance with the operation of the circuit breakers for controlling another portion of the bridge circuit.

10. The combination with a plurality of translating devices, circuit breakers for connecting said devices to load and supply circuits, of a motor-operated controller for controlling the operation of the breakers to effect the connection and disconnection of the units in a predetermined sequence, a relay for controlling the direction of operation of the controller, said relay having an operating coil responsive to the direction of flow of its energizing current, a Wheatstone bridge circuit for energizing the relay coil in one direction or the other dependent on the direction of unbalance of the bridge, a plurality of load relays successively operable in response to predetermined increasing and decreasing values of load for unbalancing the bridge in opposite directions to effect the connection and disconnection of units, and means actuated in accordance with the operation of the circuit breakers for restoring the balance of the bridge.

11. The combination with a power supply circuit, a load circuit, a plurality of translating units and electrically-operated switching means operable to connect and disconnect said translating units in predetermined sequence, of a control relay having a single movable coil element for selectively controlling the operation of the electrically-operated switching means, and a Wheatstone bridge circuit controlled in accordance with the number of translating units connected and the load demand for selectively controlling the operation of the control relay.

MAURICE E. REAGAN.